United States Patent [19]

de Rosnay

[11] 4,200,302

[45] Apr. 29, 1980

[54] SAIL-PROPELLED LAND VEHICLE

[75] Inventor: Arnaud L. G. de Rosnay, Paris, France

[73] Assignee: International Promotion Public Relation Establishment, Vaduz, Liechtenstein

[21] Appl. No.: 872,777

[22] Filed: Jan. 27, 1978

[30] Foreign Application Priority Data

Sep. 26, 1977 [FR] France .................. 77 28954
Dec. 12, 1977 [FR] France .................. 77 37405

[51] Int. Cl.² .................................... B62B 3/00
[52] U.S. Cl. ............................ 280/1; 280/7.12; 280/87.04 A
[58] Field of Search ............ 280/1, 11.3, 11.27, 280/11.28, 87.04 A, 7.12; 114/39, 90; 115/1 R, 1 C

[56] References Cited

U.S. PATENT DOCUMENTS

| | | | |
|---|---|---|---|
| 3,161,415 | 12/1964 | Novara | 280/11.28 |
| 3,951,422 | 4/1976 | Hornsby | 280/11.28 |
| 3,982,766 | 9/1976 | Budge | 280/87.04 A X |

*Primary Examiner*—Robert B. Reeves
*Assistant Examiner*—Gene A. Church
*Attorney, Agent, or Firm*—Cushman, Darby & Cushman

[57] ABSTRACT

A vehicle comprises a carrying board structure of a flat elongated configuration, means being provided on one face of said board structure for releasably mounting a sail-carrying mast structure, and two longitudinally spaced axle supporting means being resiliently mounted on the opposite face of said board structure. Dead axles are rigidly supported by said axle supporting means, said axles extending beyond the lateral edges of said board structure. The opposite ends of each axle comprise means for mounting vehicle travelling means having low frictional contact surfaces. In an embodiment, said travelling means are wheels provided with inflatable tires, said wheels having an outer diameter of about 30 cm.

15 Claims, 13 Drawing Figures

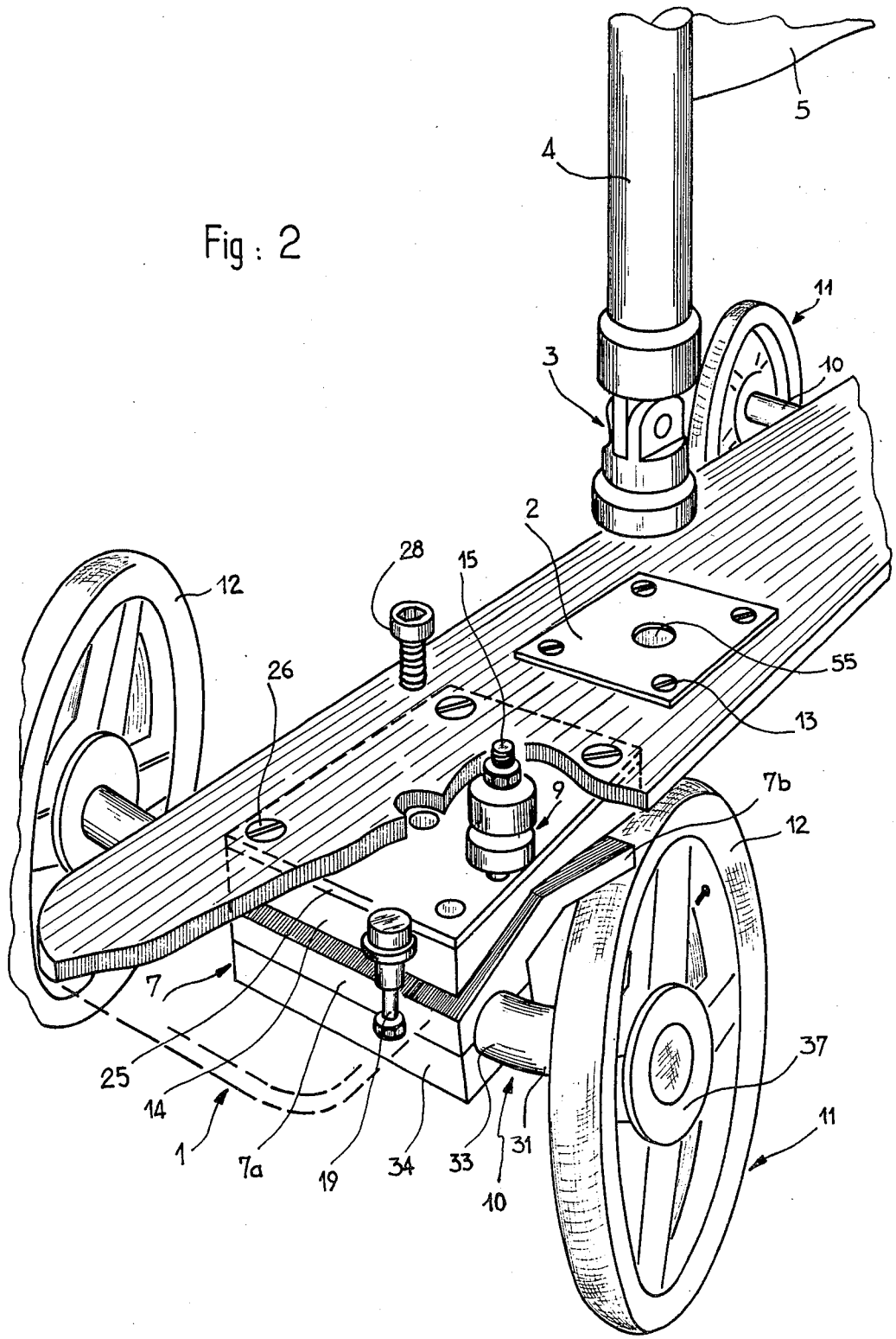
Fig: 2

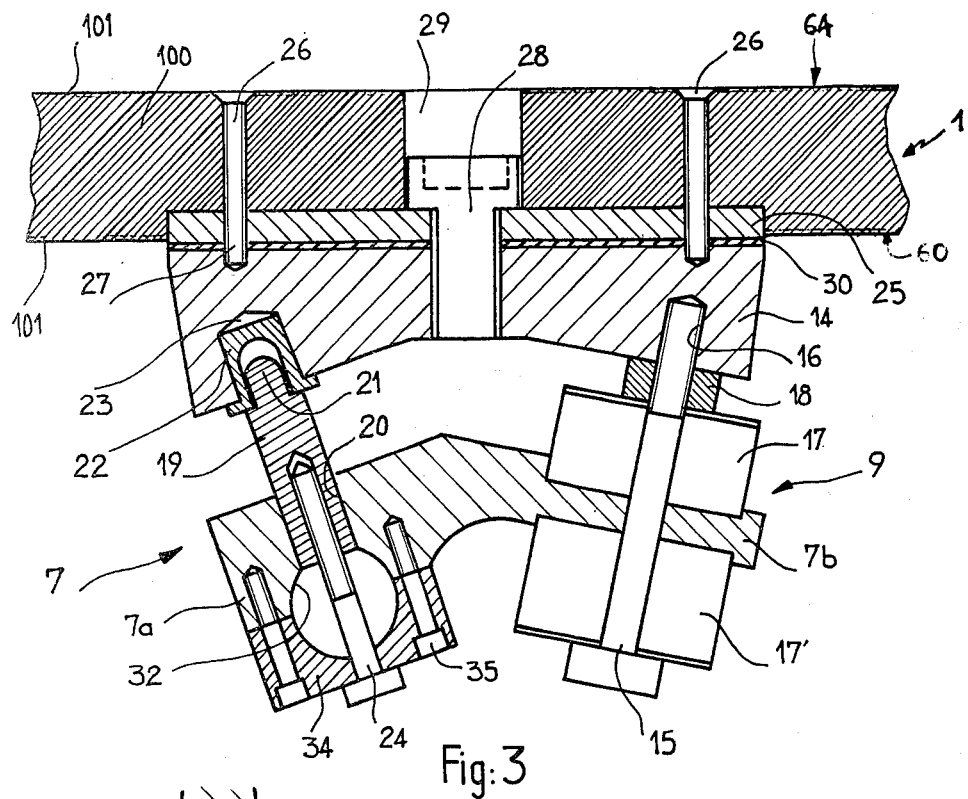
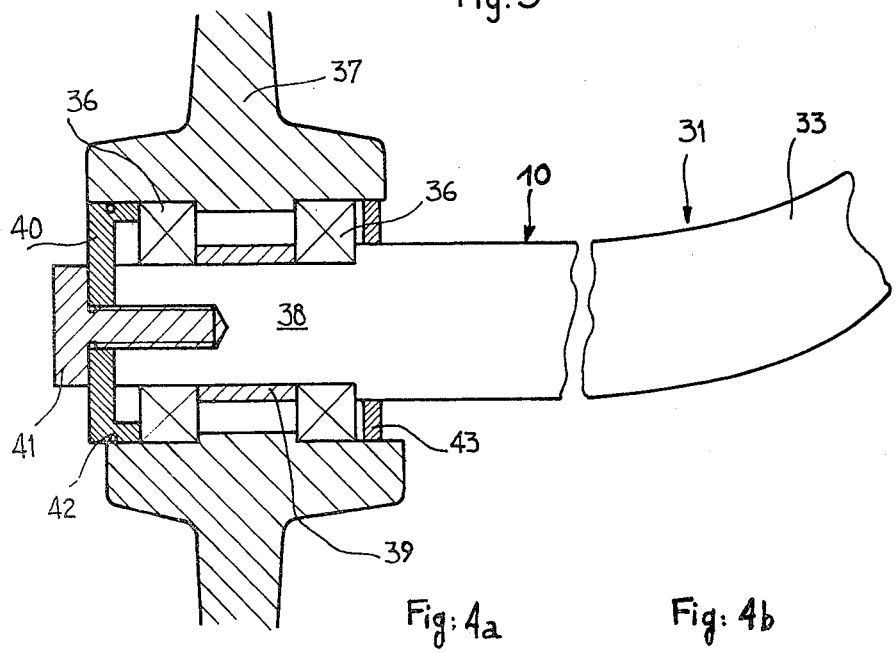

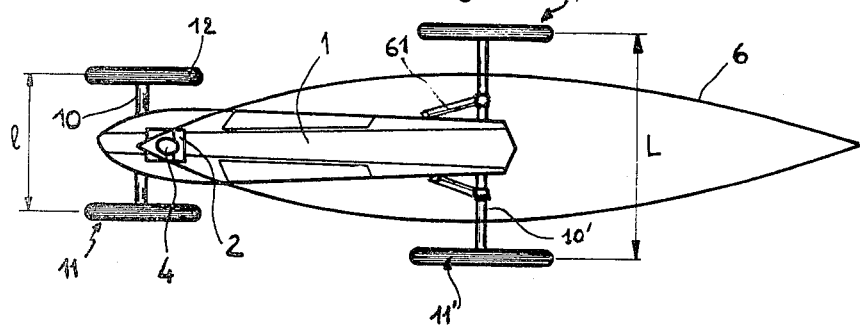
Fig: 6
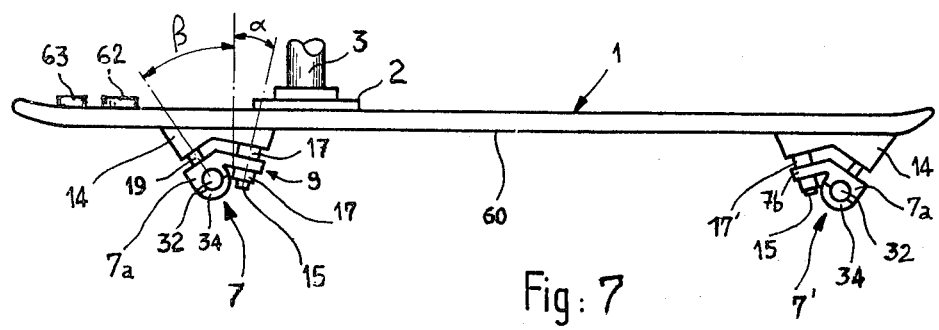
Fig: 7
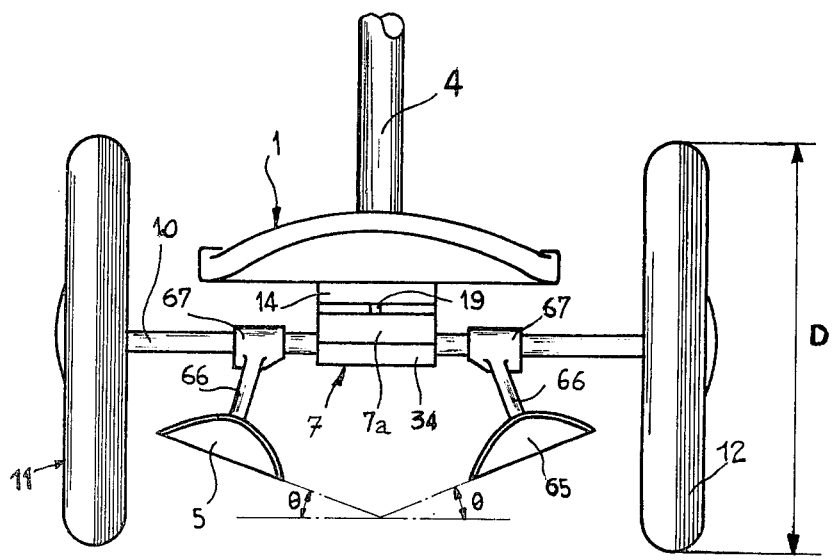
Fig: 8

SAIL-PROPELLED LAND VEHICLE

BACKGROUND OF THE INVENTION

1. Field of the Invention

The present invention generally relates to sport and entertainment vehicles, and more particularly to a single-user sail-propelled land vehicle.

2. Description of the Prior Art

The traditional aqua-planning board, commonly called surf-board, has laid recently to two successfull further developments in the form, on one hand, of nautical vessels comprised by such a surf-board equipped with means for releasably mounting a rigging and called sail-boards or "wind-surfs", and on the other hand, of a land version consisting in elongated boards of smaller dimensions equipped with rollers to constitute skate-roller boards generally known as skate-boards.

OBJECTS OF THE INVENTION

The present invention has for object to provide a vehicle of a radically new conception which conciliates the attractiveness of both the sail-boards and the skate-boards and which permits the use and the application of sailing technics to a land vehicle.

There is an object of the present invention to provide a sport land vehicle of a light and simple structure, which is portable and which permits the practice of sailing sports overland.

There is another object of the present invention to provide a land vehicle which is adapted to the severe and attractive exercice of the sailing and which allows the transition between the skate-board technics and the sailing sports.

There is another object of the invention to provide a wind-propelled or sailing vehicle adapted for use on loosy and solid surfaces, whereby offering attractive possibilities of utilization on earth, ice or snow, while presenting improved stability conditions and manoeuvrering possibilities, even at high speeds.

There is a further object of the invention to provide such a vehicle which is capable of reaching very high speeds while being of solid and simple construction, and easy to assemble or disassemble for transport or adaptation purposes.

SUMMARY OF THE INVENTION

In order to meet these objects, and others, a vehicle according to the invention generally comprises a carrying board structure of a generally flat elongated configuration, having a lower face, an upper face and two contoured lateral edges symmetrical with respect to a longitudinal symmetry plane; two longitudinally spaced axle-supporting means which are elastically hingedly mounted on said lower face of said board structure; travelling means having low frictional contact surfaces for displacement of the vehicle on loose or firm surfaces; a pair of axles, each having two opposite ends and each mounted within one of said axle-supporting means so as to extend substantially perpendicularly to said longitudinal symmetry plane, said opposite ends of each axle being symmetrical with respect to said longitudinal symmetry plane and extending beyond said lateral edges of said board structure; mast mounting means on said upper face of said board structure for releasably receiving a sail-carrying mast structure comprising sail control means, said mast mounting means being arranged at the vicinity of one of said axle-supporting means between said axle-supporting means; said travelling means being mounted by pairs at said opposite ends of said axles, respectively, the distance between two paired travelling means being greater that the maximum width of the board structure between said lateral edges.

According to a feature of the invention, for use on land surfaces such as wet sand of beaches, roads, flat or sloped light grazing-lands and the like, said axle-supporting means are each semi-resiliently mounted on said lower face of said skate-board, and said travelling means consist in wheels which are comprised by a hub structure and peripheral tire, the wheels of each pair of wheels being of the same diameter, said diameter being greater than the average distance between said lower surface of said board structure and a plane defined by the points at which said wheels of said two pairs of wheels contact with a firm flat surface.

According to another feature of the invention, for use on snow-covered surfaces, said travelling means consist in ski structures, each being mounted at one of said opposite ends of said axles by means of supporting legs, each extending in a plane substantially parallel to said longitudinal symmetry plane of said board structure.

According to a further feature of the invention, for use on ice or iced surfaces, said travelling means consist in ice-skate structures, each being mounted at one of said opposite ends of said axles by means of supporting legs which extend in planes substantially parallel to said longitudinal symmetry plane of said board structure.

Skate-boards are generally comprised by a carrying board structure of determined dimensions on which are hingedly mounted two gears of rollers of a small diameter, whereby permitting, by inertial propulsion and by controlling the tilting of the board structure, the realization of figures. For efficiently using such skate-boards, there is required to have relatively smooth and hard rolling-surfaces, wherefrom it results limited possibilities of utilization, more particularly, at relatively high speed.

On the contrary, the vehicle of the invention behaves well on a wide range of land surfaces, can be operated as a light ship, offers improved strength and stability properties which permit to reach travelling speed much higher than with skate-boards or with the nautical vessels having the same sail surface, while offering improved controllability.

According to a preferred feature of the invention, the axles are of inegal length, the gauge of the smaller or front axle being greater than 1.2 times the maximum width of the board structure, the other axle having a gauge of about 1.5 times the gauge of the smaller axle.

According to another feature of the invention, the travelling means of each pair have a camber different from zero.

Further characteristics and advantages of the present invention will now appear from the following description of various embodiments, made in relation with the appended drawings, on which:

BRIEF DESCRIPTION OF THE DRAWINGS

FIG. 2 schematically shows at a larger scale an axle supporting means according to the invention;

FIG. 3 is a longitudinal cross-section of the axle supporting means shown on FIG. 2;

FIG. 4 is a view, partially in cross-section, showing the mounting of a wheel hub on the end of a rigid axle;

FIG. 6 is a top view of a preferred embodiment of a wheel board according to the invention;

FIG. 7 is a side view of the wheel board shown on FIG. 6 with the wheels and the mast removed;

FIG. 8 is a front view of an alternative embodiment of a wheel board according to the invention;

DETAILED DESCRIPTION OF THE DRAWINGS

Figure 1:
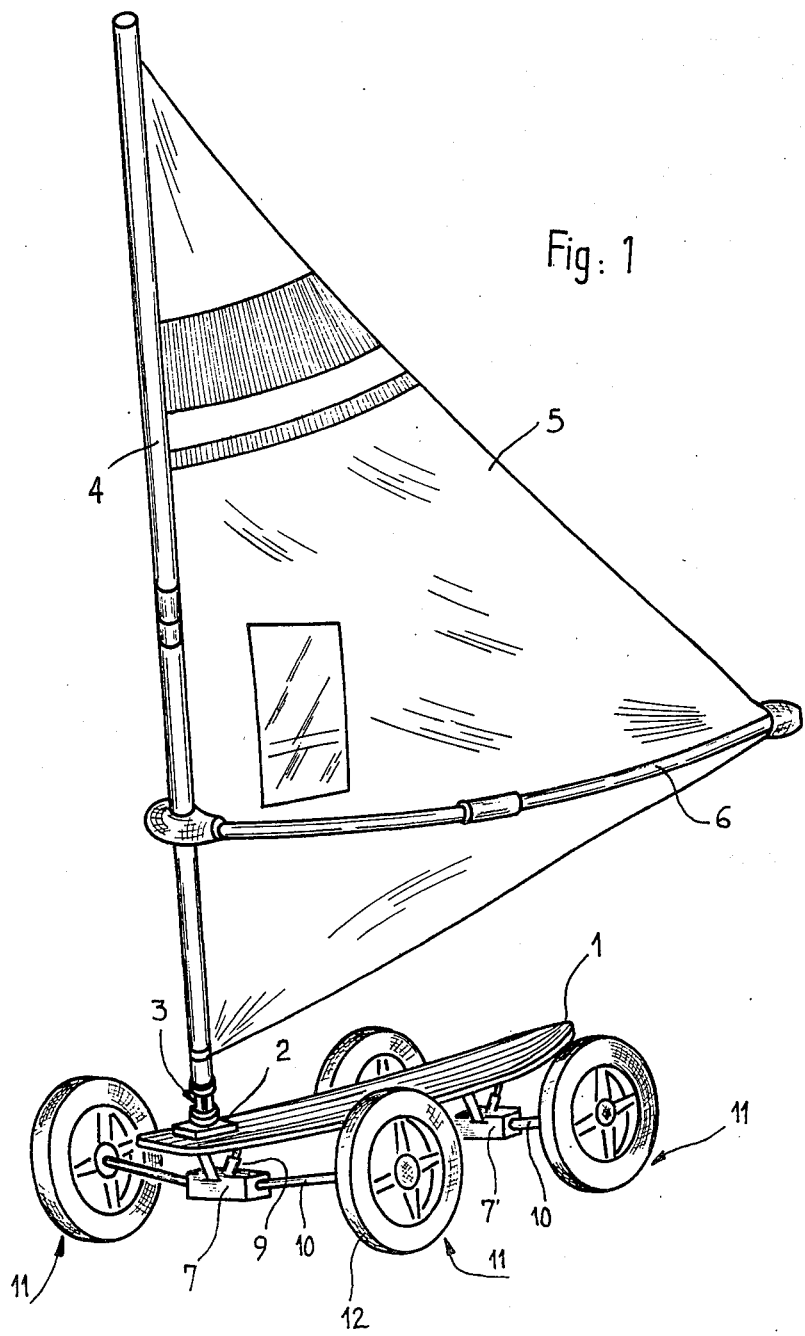
FIG. 1 is a schematic view of a sail-and-wheel-board of the invention.

With reference to the embodiment shown on FIGS. 1 and 2, a vehicle of the sail-and-wheel board type according to the invention generally comprises an elongated carrying board structure 1 symmetrical with respect to a longitudinal symmetry plane having for instance a width between 15 and 20 cm, a length generally between 60 and 140 cm, and made of sandwich materials as it will be precised hereinbelow. On an end portion of the board structure is arranged a supporting member or seating 2 which is mounted on the upper surface 64 of the board and which is adapted to receive a stud (not shown) of a supporting hinge 3 of a mast structure 4 to which is connected a sail 5 and an arcuated double boom structure 6 of the "wishbone" type, i.e. a mast-sail arrangement of the kind used on wind-surfs. On the lower face 60 of the board 1 are semi-elastically hingedly mounted with respect to said board two longitudinally spaced axle supports 7 and 7' which are advantageously identical, by means, on one hand of a body 7a and on the other hand by means of damping assembly 9 comprising damping resilient members of the type called "silent blocks".

On the supports 7 and 7' are mounted axles 10, the form and the mounting of said axles on said supports depending upon the required camber for the wheels, as it will be explained later. According to a feature of the invention, wheels 11 are mounted at the opposite ends of the axles 10. Wheels 11 are of the hub and tire configuration, the tires 12 being preferably inflatable in order to reduce the friction factor on uneven land surfaces while providing damping properties, whereby allowing high speeds to be reached with a good attitude hold.

According to another feature of the invention, the outer diameter of the wheels 11 is comprised between 1.1 and 1.8 times the average distance between the lower surface 60 of the board 1 and a flat surface on which the wheels 11 are supported, so as to provide for an adequate rolling together with improved vehicle control properties.

As better shown on FIG. 2, the seating or base 2 for receiving the supporting hinge 3 of the mast is advantageously slightly set back from the front axle support 7 for boards having a length greater than 80 cm to achieve a better gross stability of the vehicle and to provide at the front end of the board an accessible area allowing the user to pass round the mast. Said seating 2 is advantageously comprised by a parallelepipedic block made of wood, plastic material or metal, mounted on the board 1 by four screws 13 preferably of the countersunk head type, said seating being provided at its upper surface with a recess, such as a blind hole 55 or a groove, for receiving the mounting means, such as a stud, at the lower end of the mast 4.

With reference to FIGS. 2 and 3, there is shown a preferred embodiment for the axle supports 7, 7' mounted on the wheel-board. The axle supports 7 comprise a body portion 7a for receiving the axle and an extending portion 7b, integral with the body portion 7a, on which is mounted the damping device 9. The axle support 7 is connected to the board 1 through a mounting base 14 attached to the lower face of the board and having, in longitudinal cross-section, a lower surface in the shape of a wide-open inverted V. The axle support 7 is associated to the mounting base 14, on one hand by a screw 15, the threaded end of which is screwed within a tapped bore 16 formed within one end or wing portion of the mouting base 14, said screw 15 supporting an assembly of rubber damping members 17, 17' of the silent block type, the compression of which is controlled by the screwing of screw 15 and by a check-nut 18. The hardness of the damping assembly 9 depending from the compression of the resilient member 17 and 17', the harder is the damping device, the lesser are the pivoting abilities of the axles with respect to the running or sailing direction of the vehicle, whereby improving the stability of said vehicle at high speeds. The axle support 7 on the other hand is associated to the mounting base 14 by a pivot member 19 having one end rigidly mounted within the body portion 7a and having its outer end formed with a part of reduced diameter 21 received within a resilient hinge sleeve arranged within a bore 23 formed in the opposite end or wing portion of the mounting base 14. In preferred embodiments of the invention embodying dead axles, the longitudinal axis of the pivot member 19 is adapted to cross the axis of the axle, said axle being transversed and firmly held within a transversal axle-receiving recess 32 in the body portion 7a by a screw 24 which rigidly connects the pivot member 19 to the body portion 7a. The body portion 7a is advantageously formed with a cylindrical recess 32 for receiving the central portion of a straight axle 10 or of the straight portion 33 of a crank axle 31 (shown on FIGS. 2 and 4), in the case a crank axle is required to provide a wheel camber, preferably a negative wheel camber. The axle supporting means comprises at least one clamping member 34, formed with a transversing bore for receiving the screw 24 and adapted to be connected to the body portion 7a by screws 35 for clamping or clasping a dead axle onto the body porton 7a.

Turning back to FIG. 3, according to a preferred embodiment a backing plate 25, for instance made of metal, is arranged within the lower face 60 of the board 1 and attached thereto by means of four screws 26, the lower ends 27 of which serve as locating spigots for the mounting base 14 wherein said lower ends are received within blind holes, said mounting base 14 being attached to the board 1 by a round-socket head screw head screw 28 received within a spotfaced recess 29 in the board. Thus, by unscrewing the screw 28, an axle assembly can easily be separated from the board, for instance for transporting same. A setting or positioning plate 30, made of a rubber sheet, can be interposed between the backing plate 25 and the mounting base 14.

With reference to FIG. 4a, there is shown the mounting of a wheel hub 37 at the end of a dead axle 10, said axle being either straight all over its length or of the crank type with end portions extending at angles with respect to a straight central portion illustrated by 33 on FIG. 4b. Two roller bearings 36 are arranged between the hub 37 of the wheel and the end of reduced diameter 38 of the axle with a cylindrical spacer 39 therebetween, said spacer being advantageously cemented for instance by an adhesive such as that sold under the trade name "loctite". The wheel board of the invention being more particularly designed for use on beaches, i.e. in severe marine conditions, with the presence of sand, the bearings 36 have to be sealed. In the embodiment shown on FIG. 4, said bearings are secured on one side by a flanged end plate 40 which is held against the end 38 of the axle 31 by a front screw 41, said flanged end plate 40 being provided at its outer periphery with a sealing O-ring 42. The sealing of the inner side of the hub is made by a lip seal 43.

Figure 5:
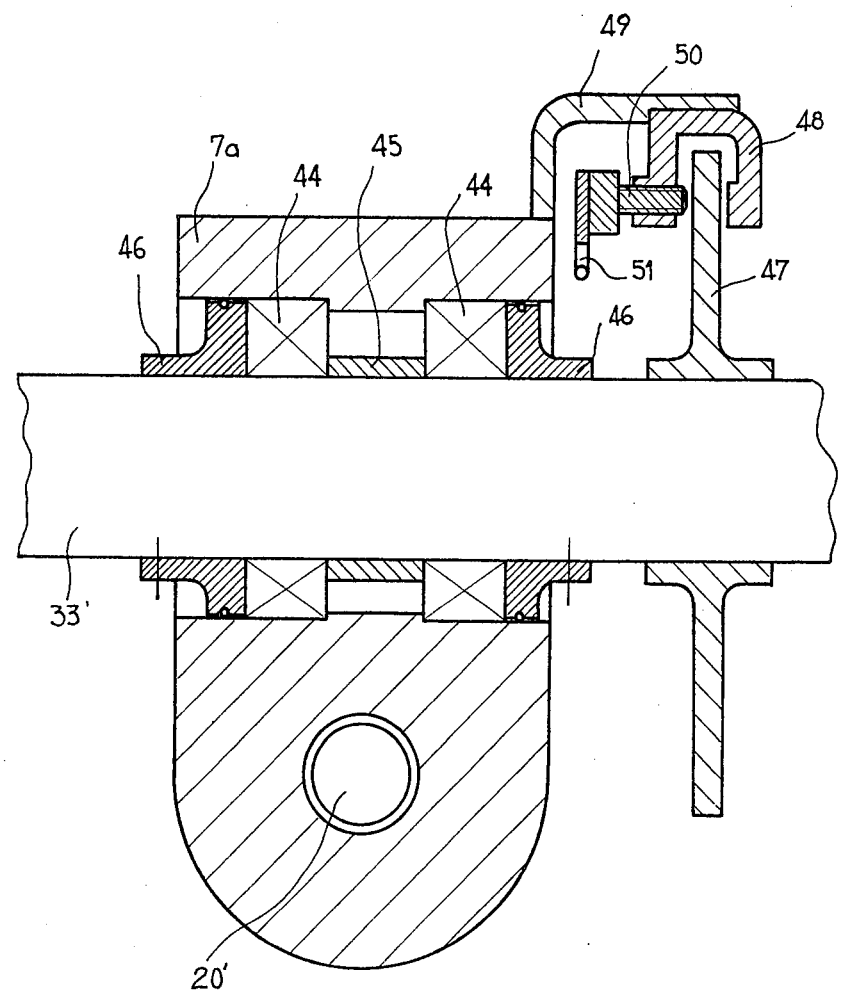
FIG. 5 schematically shows an axle supporting means adapted for the mounting of a rotating or live axle.

There is shown on FIG. 5 another embodiment of the axle supporting means of the invention for the mounting of a live axle. In said embodiment, the axle 33' is entirely straight and the wheels are rigidly connected at the ends thereof. In said embodiment, two roller bearings 44 are arranged within a shouldered bore formed in the body portion 7a of the axle support 7 with an annular spacer 45 therebetween, sealing sleeves 46, fitted on the axle, holding the bearings and separating same from the exterior. In said embodiment, the bore 20' for receiving the pivot member 19 is off-set from the live axle 33'. According to a further embodiment, a disc 47 is mounted, e.g. keyed, on the rotating axle 33', the peripheral portion of the disc 47 extending into the gap of a stirrup or calliper 48 which is supported by a mounting plate 49 connected to the axle support 7, and provided with a braking device, such as for instance a coarse-threaded screw 50 controlled by an actuating lever 51 connected by a convenient linkage (not shown) actuable by the foot of the user on the wheel-board such as to provide a controlled braking of the vehicle.

In the embodiment shown on FIGS. 1 to 3, the board structure has to be designed so as to have the improved mechanical strength properties required with respect to the heavy conditions when manoeuvrering with high winds, more particularly as concerns the required twisting and bending strength properties. Therefore the board structure 1 is of the sandwich type, i.e. comprised by a core 100, for instance of a plywood having a thickness of about 20 mm, which is coated on its upper and lower faces with a skin 101 of an epoxy resin with fiber glass filler. Alternatively, the core 100 may be made of a cellular plastic material such as polyurethane foam, or formed with a honeycomb structure. In order to give the user a good seating, and to authorize a wheel configuration providing a convenient wheel base suited to the wheel gauge, the board structure has preferably an overall length between 70 and 140 cm, with a wheel base range between 60 and 120 cm, preferably between 110 and 120 cm, for a board width comprised between 17 and about 35 cm. In a preferred embodiment, the clamped dead axles are formed from nickel-chrome plated tube having a diameter between 20 and 30 mm, the wheels 11 having a diameter of about 30 cm, the wheel gauge being about 35 cm and the wheel base about 1.10 m. With a sail surface of about 4.5 $m^2$, the vehicle perfectly runs even on wet sand of a beach at low tide and can reach speeds higher than 35 km/h with a wind of about 15 km/h, speeds higher than 80 km/h being obtained with higher winds. The propulsion efficiency is far better than with wind-and surf-boards and since the drop keel is suppressed, it is possible to easily beat-up to windward and to sail cross-hauled.

There is shown on FIG. 6 a preferred embodiment of the wheel-board of the invention having dead axles. Tests conducted with a wheel-board as that shown on FIG. 1 have revealed that, due to the very high speeds the vehicle can reach, there were problems of stability and attitude control of the vehicle at such high speeds, more particularly, on uneven surfaces. Therefore, in order to insure a better stability without substantially reducing the manoeuvrering characteristics of the vehicle, in the preferred embodiment shown on FIG. 6 the axles 10 and 10' are straight all over their length and the front pair of wheels has a gauge lower than the gauge of the rear pair of wheels. With such an arrangement, it has been determined in situ that the lateral stability, i.e. the ability of the vehicle to resist to lateral skidding or yawing for a normal load, e.g. the weight of the user, was considerably increased, even with friction coefficient of the wheels on flat solid surfaces, such as cemented or asphalted runways, lower than 0.05, by increasing the rear wheel gauge with respect to the front wheel gauge, whereby allowing the rear axle to be more loaded. A better repartition of the load, due to the weight of the user and to the vertical component of the propulsing forces transmitted by the mast, on an enlarged polygone of support make possible the substitution of the wheels rotatably mounted at the ends of the axles by other low frictional travelling means, for instance slipping means such as skis or ice-skates as it will be seen hereinbelow.

In the preferred embodiment shown on FIGS. 6 and 7, the mounting means 2 for a releasable mounting of a mast structure 4 is offset from the front axle supporting means 7, in the direction towards the rear axles supporting means 7', and the gauge L of the front pair of wheels is lower than the gauge L of the rear pair of wheels. Preferably, the gauge ratio between the rear axle and the front axle is comprised between 1 and 2, and is advantageously about 1.5. For a wheel-board having a length of about 150 cm, an average width of about 20 cm and a wheel base of about 100 cm, the front wheel gauge L is about 40 cm, the rear wheel gauge L being about 60 cm, the diameter of the tired wheels being about 30 cm and the sail having a surface greater than 4 $m^2$.

To have a yet better stability, more particularly on uneven soils, the axle supporting means 7 and 7' are mounted head to tail on the lower face 60 of the board structure 1, i.e. with the damping member supporting flange portions 9 and 9' facing one another. The tilting angle $\alpha$ in the symmetry longitudinal plane of the board between the axis of the screw 15 and a direction perpendicular to the adjacent portion of the board is about 10°, the tilting angle $\beta$ between the axis of the pivot member 19 and said direction perpendicular to the board being comprised between 40° and 45°, preferably about 45°. In order to take into account the important lever arm of the rear axle, the resilient material of the damping members 17' of the rear axle supporting means are chosen to present a maximum elasticity for a given Shore hardness. Additionally, gaz or oleopneumatic shock-absorbers 61 can be disposed between the lower face of the board and the laterally protruding portions of the rear axle. The board structure is advantageously equipped at its front end with a Bowden-cable driven tachometer 62 and with a compass 63. The four wheels are advantageously of a same diameter D, but the wheels of a pair of wheels may be of a diameter different from the wheels of the other pair of wheels, the axle supporting means being thus designed so as to have the board structure generally extending in an horizontal plane when the wheels contact a flat horizontal surface. The rear end of the board structure may have the shape of a kick-tail.

There is shown on FIG. 8 another embodiment of the wheel-board of the invention. In said embodiment, on each axle (e.g. the front axle 4 on FIG. 8) are mounted a pair of skis 65, each on one side of the axle supporting means 7, between the wheels 11. The skis 65 are mounted on the axles for instance by means of supporting posts 66 connected to mounting sleeves 67 splined or keyed on the axles. The rear axle 4' (not shown) is also provided with a pair of skis analogue to the front pair of skis 65, the skis of said rear pair of skis being separated from a distance advantageously greater than the separating distance between the front skis 65. The ground clearance between the skis and the rolling surfaces is advantageously comprised between ½ and ⅓ of the radius of the wheels 11, said radius being comprised between 15 and about 20 cm.

With such a vehicle, it is thus possible to normally roll over on a hard or loose soil, for instance the sand of a beach and, when reaching a high rolling speed, for instance higher than 60 km/h, to drive the vehicle towards the sea, so as to have thereon a sliding displacement called "aqua-planning" succeeding to the rolling displacement, till the floating board has its speed lowered by the friction in the water. In order to give a better lateral stability when aqua-planning, the skis 65 (65') of each pair are advantageously inwardly inclined, the angle $\theta$ between the lower or sliding surface of one ski and an horizontal plane being comprised between 10° and 30°.

Figure 9:
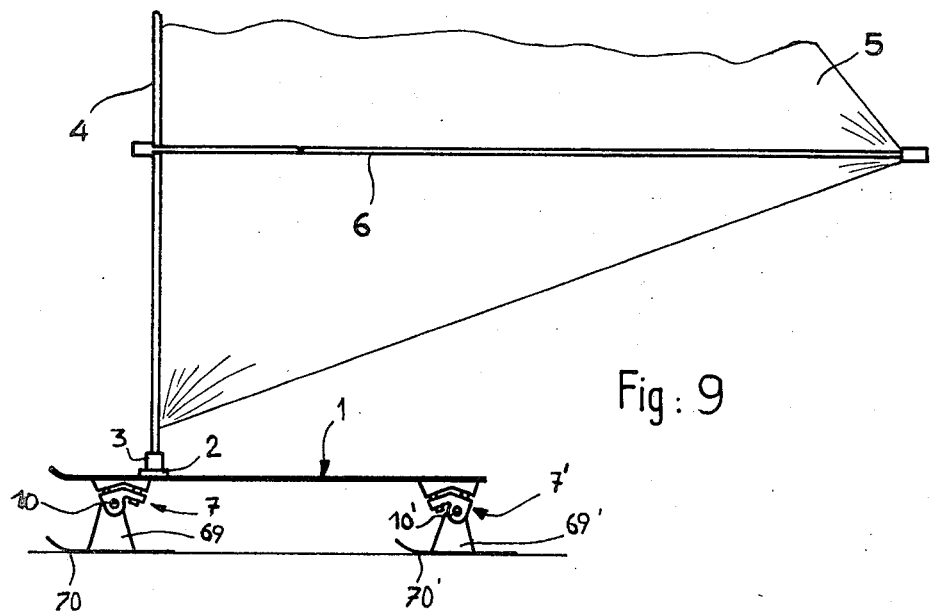
FIG. 9 is a side view of a second embodiment of the vehicle of the invention.
Figure 10:
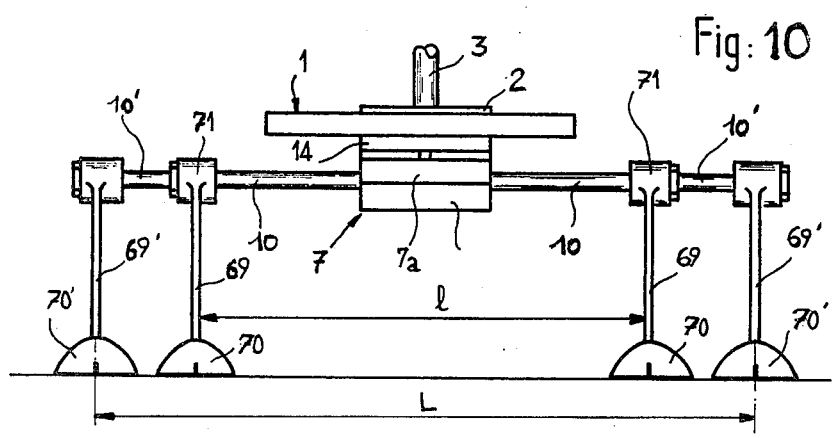
FIG. 10 is a front view of a preferred embodiment of the vehicle shown on FIG. 9.
Figure 11:
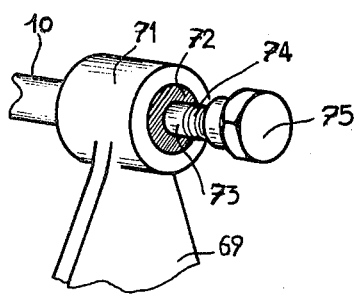
FIG. 11 is a partial view at a larger scale of the ski supporting means shown on FIG. 10.

There is shown on FIG. 9 a further embodiment of the vehicle according to the invention adapted for use on snowed surface. In said embodiment, supporting tabs or plates 69, 69' are mounted at the end of the axles 10, 10', short skis 70, 70' being adapted at the lower end of said supporting plates. In order to ensure a better stability on uneven or bruised snowed surfaces, the supporting plates 19, 19' are each advantageously mounted, as better shown on FIG. 6, at the end of an axle by means of a tubular mounting sleeve 71 within which is arranged a bushing 72 made of a resilient material, such as for instance filled rubber or an elastomeric material, said bushing cooperating with an end portion 73 of reduced diameter of the axle formed with a threaded end 74 for receiving a nut 25, whereby, when screwing the nut 25 on the threaded end 74, the supporting plate 69 is firmly held against a shoulder (not shown) of the axle 10 at the junction with the end portion 73 while causing the bushing 22 to radially outwardly expand, whereby the support 69 is firmly mounted at the end of the axle while being permitted to be resiliently moved along an angular deflection movement of a weak amplitude around the axis of the axle within the plane of the supporting plane. Alternatively, the bushing 72 can be slipped on a peripherically smooth end portion of reduced diameter, such as the end portion 38 on FIG. 4a, and held and expanded by an end plate secured by an end screw, as in FIG. 4a.

In the embodiment shown on FIG. 4, with a board having between the front and rear axles a distance of about 100 cm, the skis 70, 70' have a length of about 50 cm, a width between 10 and 20 cm, the distance in the longitudinal direction of the board between two successive skis of the front and rear pairs of skis being about 50 cm.

Figure 12:
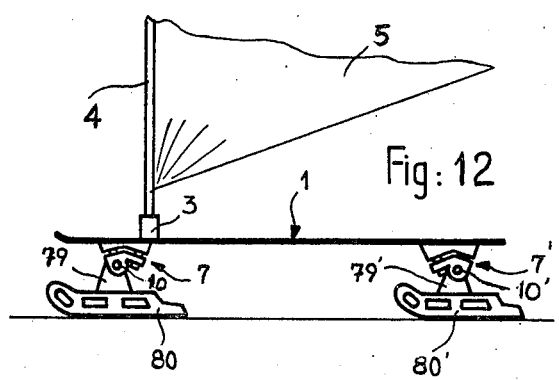
FIG. 12 is a schematical side view of a further embodiment of the vehicle according to the invention.

There is shown on FIG. 12 another embodiment of the vehicle according to the invention wherein the supporting plates or tabs 79 and 79' are here connected by their lower end to ice-skates 80, 80'. Ice-skates 80, 80' can be of a known configuration, for instance made of stainless steel and having a thickness of about 5 mm, a height of about 30 mm and a length comprised between 30 and 40 cm. In said embodiment, the ground clearance of the board is advantageously lowered to a value comprised between about 15 and 20 cm.

In the embodiment where the travelling means consists in skis or ice-skates, the distance between the end of the axles is advantageously between 20 and 40 cm, the gauge ratio between the rear gauge and the front gauge being in this case chosen between 1 and 1.5.

Although the present invention has been disclosed in relation with preferred embodiments, other embodiments of the invention could be made without departing from the scope thereof, as defined by the following claims, and all matter contained in the above description shall be interpreted as illustrative and not in a limiting sense. More particularly, the length of the front axle can be considerably reduced for the mounting of a single front travelling means, more particularly in the case of slipping means, the corresponding supports 69 or 79 having thus at the upper end thereof the shape of a V, the wings of which being each connected to one end of the front axle, on both sides of the axle supporting means.

What I claim is:

1. A vehicle comprising:
   a carrying board structure of a generally flat elongated configuration having an upper face and a lower face, and two lateral edges symmetrical with respect to a longitudinal symmetry plane;
   two longitudinally spaced axle supporting means elastically hingedly mounted on said lower face of said board structure;
   travelling means having low frictional contact surfaces for displacement of the vehicle on loose or firm surfaces;
   a pair of axles, each having two opposite ends and adapted for being mounted within one of said axle supporting means so as to extend substantially perpendicularly to said longitudinal symmetry plane, and to have said opposite ends of each axle symmetrical with respect to said longitudinal symmetry plane and extending beyond said lateral edges of said board structure;
   a sail-carrying mast structure comprising sail control means and equipped with a hinged mast-supporting means;
   mounting means on said upper face of said board structure for removably receiving said mast supporting means, said mounting means being arranged at the vicinity of one of said axle supporting means mounted on said lower face of said board structure;
   said travelling means being mounted by pairs at said opposite ends of said axles, the distance between two paired travelling means being greater than the maximum width of said board structure between said lateral edges;

said axle supporting means comprise an axle supporting body and a base member;

said base member having a substantially flat upper surface and a lower surface which has a cross-section the configuration of an inverted wide open V having flat inner wing surfaces;

means being provided for rigidly attaching said base member by said upper face thereof onto said lower face of said board structure;

said axle supporting body being formed with a transversal recess for receiving an axle and being connectable to said base member by a pivot member having one end mounted within said body and having its other end loosely received within a bore formed in said lower surface of said base member, and by a connecting screw screwed within a tapped bore formed within said lower surface of said base member;

said screw passing through at least one resilient damping member interposed between said body and said base member;

said screw and said pivot member each extending substantially perpendicular to the flat inner wing surfaces of said V-shaped lower surface of said base member;

means being provided for holding a tubular axle within said recess and for preventing same from displacement in a direction perpendicular to said longitudinals symmetry plane of said board structure.

2. A vehicle according to claim 1, wherein said travelling means are wheels, said wheels being each provided with a rubber tire, the wheels of each pair of wheels having the same diameter, said diameter being greater than the average distance between said lower face of said board structure and a plane defined by the points at which said wheels of said two pairs of wheels contact with a firm surface.

3. A vehicle according to claim 2, wherein said tires of said wheels are inflatable tires.

4. A vehicle according to claim 2, wherein each pair of wheels has a gauge comprised between 1.2 λ and 2.5λ, λ being the average width of said board structure between said lateral edges.

5. A vehicle according to claim 3, wherein the length ratio between the length of the axle adjacent said mounting means and the other axle is about ⅔.

6. A vehicle according to claim 5, wherein said axles are straight and are each clamped within a respective said axle supporting body so as to be prevented from rotating about an axis perpendicular to said longitudinal symmetry plane, said wheels being mounted at said ends of said axles by means of bearings.

7. A vehicle according to claim 6, wherein said wheels are all of the same diameter, the average distance between said plane defined by the points at which said wheels contact a firm surface and said lower surface of said board structure being about ⅔ D, D being the diameter of said wheels of said two pairs of wheels, D being comprised between about 25 and 35 cm.

8. A vehicle according to claim 6, wherein said axles are tubular and straight and are each rotatably mounted within a said axle supporting body by means of a pair of bearing received within said axle supporting body, said wheels being rigidly mounted at said opposite ends of said axles.

9. A vehicle according to claim 7, wherein said pivot member of each said axle supporting means mounted on said lower face of said board structure extends in a direction at an angle of about 10° with a direction perpendicular to the adjacent zone to said lower surface of said board structure, the associated said screw of said axle supporting means extending in a direction at an angle between 40° and 45° with said direction perpendicular to said lower surface of said board structure.

10. A vehicle according to claim 9, wherein at least one of said axles is provided with at least one brake disc, actuatable brake means being mounted on the associated said axle supporting means.

11. A vehicle according to claim 7, wherein a pair of ski means is mounted on each axle, between said wheel, each ski means of said pair of ski means being located on one side of said axle supporting means with respect to said longitudinal symmetry plane, the distance between said ski means and said plane defined by the points at which said wheels contact with a firm surface being comprised between ¼ D and ½D, D being the diameter of said wheels.

12. A vehicle according to claim 11, wherein each ski means has a lower or gliding surface substantially in a plane extending at an angle lower than 90° with respect to said longitudinal symmetry plane.

13. A vehicle according to claim 1, wherein each axle is straight and is clamped within a corresponding said axle supporting body so as to be prevented from rotating about an axis perpendicular to said longitudinal symmetry plane, said travelling means comprising ski means, each being mounted at one of said opposite ends of said axles by means of supporting legs each extending in a plane substantially perpendicular to the associated said axle.

14. A vehicle according to claim 13, wherein each supporting leg has an elongated lower end and a substantially hollow cylindrical upper end having an axis extending perpendicular to said general plane of said leg, said ski means being each rigidly connected to said lower end of said supporting leg, each leg being mounted by said upper end thereof to one of said opposite ends of said axles by means of a bushing member made of a resilient material arranged within said cylindrical upper end so as to allow said leg to be slightly elastically pivoted within a plane perpendicular to said associated axles.

15. A vehicle according to claim 1, wherein each axle is straight and is clamped within a corresponding said axle supporting body so as to be prevented from rotating around its main axis, said travelling means being comprised by ice-skates, each being connected to one of said opposite ends of said axles by means of supporting legs each extending in a plane substantially perpendicular to the associated said axle.

* * * * *